Oct. 7, 1952
R. T. LUNDY
2,613,239
DYNAMOELECTRIC MACHINE BRUSH
Filed July 14, 1950
2 SHEETS—SHEET 1
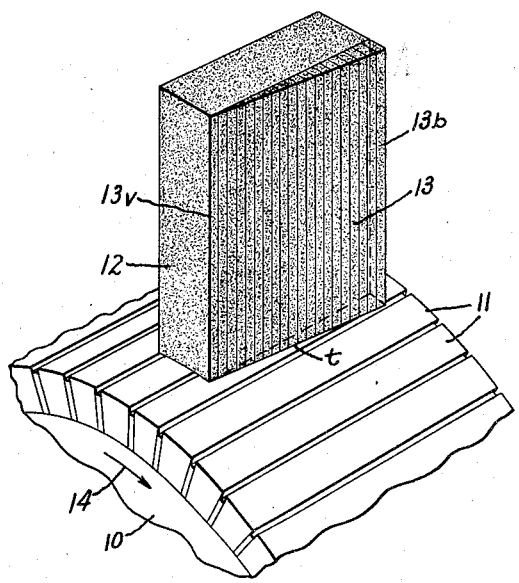
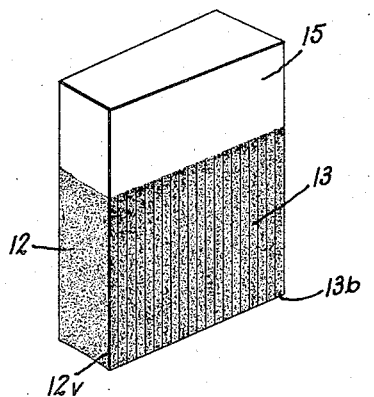
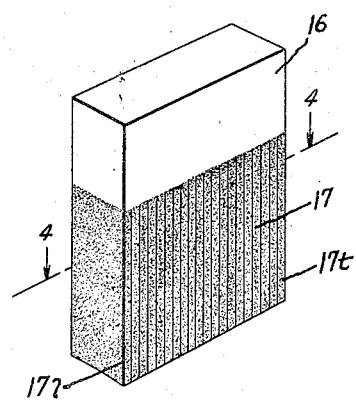
Inventor:
Richard T. Lundy,
by Ernest C. Britton
His Attorney.

Oct. 7, 1952 — R. T. LUNDY — 2,613,239
DYNAMOELECTRIC MACHINE BRUSH
Filed July 14, 1950 — 2 SHEETS—SHEET 2
Fig. 4.
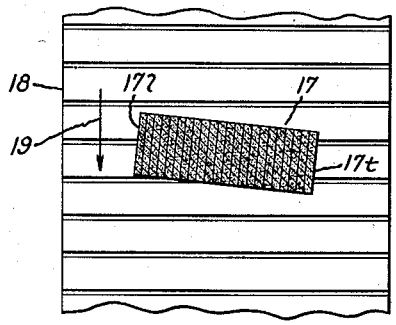
Fig. 5.
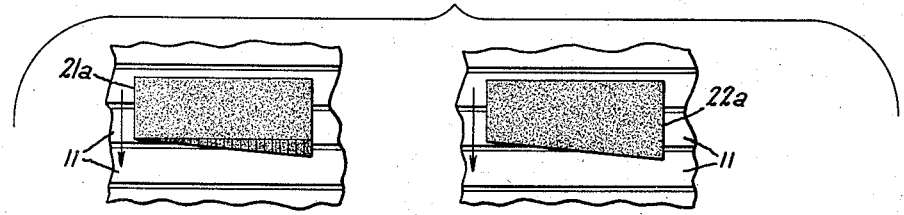
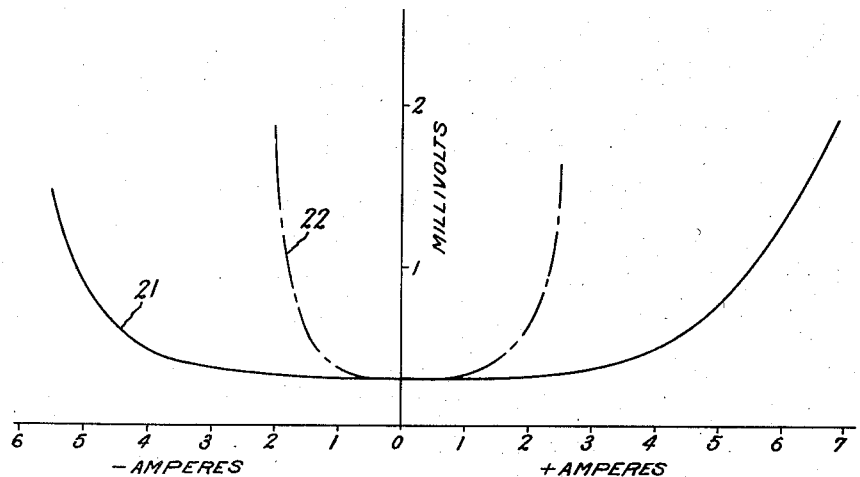
Inventor:
Richard T. Lundy,
by Ernest C. Britton
His Attorney.

Patented Oct. 7, 1952

2,613,239

UNITED STATES PATENT OFFICE 2,613,239

DYNAMOELECTRIC MACHINE BRUSH

Richard T. Lundy, Schenectady, N. Y., assignor to General Electric Company, a corporation of New York Application July 14, 1950, Serial No. 173,804

4 Claims. (Cl. 171—325)

My invention relates to brushes for dynamoelectric machines and has particular significance in connection with a brush adapted to operate on a segmented commutator to provide superior commutation and reduced radio noise interference.

It has heretofore been known to use a brush comprising multiple laminations of varying resistivity with, for example, a high resistance lamination at the trailing edge or at both edges of the brush. Heretofore however the laminations have been generally arranged parallel to the commutator segments in order to form paths of greatest resistance between layers arranged axially of the commutator rather than transverse thereto. In many applications such constructions have not completely obviated poor operating characteristics including the susceptibility to the creation of radio interference. One reason that a complete solution has not been found is that it is preferable to make the laminations of carbonaceous material but such material is brittle and laminations thereof cannot be readily provided or utilized if they are less than, for example, one-thirty-second inch thick for otherwise they would be too fragile. Thus a definite limit (for example of one-thirty-second-inch) is placed upon the increment of varying resistivity which can be utilized in such conventional brushes which are laminated with the laminations extending parallel to the commutator segments.

It is an object of the present invention to provide simple and inexpensive means for overcoming the above mentioned difficulties.

A further object of the present invention is to provide a brush which, compared to conventional brushes, is more efficient as regards spark quenching at the trailing edge thereof.

A still further object of the present invention is to provide means for minimizing radio noise caused by arcing contact of electric contact brushes with commutator type collectors by a novel arrangement of brush laminae.

In the embodiments herein illustrated and described, the means employed comprise a brush having laminations which extend transverse of the commutator segments and terminate at the trailing edge of the brush at points which are spaced apart both axially and peripherally with respect to the commutator to provide smaller gradients of varying resistivity than is possible with conventional arrangements, thereby to improve the commutation and substantially reduce radio noise generation.

Other objects and advantages will become apparent and my invention will be better understood from consideration of the following description taken in connection with the accompanying drawing in which Fig. 1 is a perspective view of a portion of a dynamoelectric machine commutator together with a brush comprising a solid portion and a wedged shape assembly of transverse laminations affixed to the trailing edge thereof to illustrate one embodiment of my invention; Fig. 2 is a perspective view illustrating a modification and in which the assembly has been metal sprayed or plated at one end to unite the solid body portion and the wedge shaped assembly; Fig. 3 is a perspective view of a rectangular brush forming another embodiment of my invention when used as shown in Fig. 4 slightly cocked with respect to the commutator segments; Fig. 4 is a view along the line 4—4 of Fig. 3 but showing also a portion of an associated commutator; and Fig. 5 is a graphic representation showing characteristic curves obtained from tests on a brush such as that illustrated in Fig. 1 compared to a solid brush of similar shape and therefore tapered at its trailing face.

Referring now to Fig. 1, 10 represents a portion of a dynamoelectric machine commutator having segments 11 extending parallel to the axis of rotation of the commutator. The peripheral surfaces of the commutator segments are contacted by a brush held by a brush holder (not shown). The brush has a solid main body portion 12 of conventional fairly low resistance carbonaceous material and on one edge (the trailing edge, as hereinafter defined) of the solid portion 12 there is cemented or otherwise fastened an assembly of transverse laminations 13, each of which abut on the block portion 12. It may be found most convenient to assemble the laminations in block form, secure them to the main block 12 and then grind or otherwise machine the assembly of laminations off to provide the wedge shaped assembly of lamination 13 shown. The laminations are also of carbonaceous material but, in a manner well known to those skilled in the art, the various laminations are of progressively varying resistivity and may, for example, vary from the shortest lamination $13v$ (at the V of the wedge) having a specific resistivity of 0.001 ohm per inch cube, to the longest segment $13b$ (at the base of the wedge) having a specific (or unit) resistivity of 1.0 ohm per inch cube.

It will be observed that with a normal direction of commutator rotation as assumed and indicated by the arrow 14, the trailing edge "t" of the brush will be the last to leave an individual commutator segment and with the arrangement just described the segmental parts breaking contact with the commutator gradually increase in resistance in incremental amounts (measured in the direction of commutator rotation) which are very much smaller than would be possible if the material were merely conventionally laminated in the direction taken by the commutator segments parallel to the commutator axis of rotation.

It will be understood by those skilled in the art that individual insulation need not necessarily be provided between the laminations since the surface contact resistance will in many cases be sufficient for the purpose of the application. I have found a very effective bond can be formed between laminations, and between lamination assembly and body portion by coating one end of each of the parts with metal such as by dipping in tin and then copper plating or metal spraying and then assembling the parts and subjecting them to heat and pressure to provide an adequate fusion of the parts with a uniform metal coating 15 as indicated in Fig. 2. If desired one of the above metal coating steps may be omitted or the assembly may be additionally copper sprayed at the one end after the parts are assembled to firmly bind the parts together. In order to preserve uniform outer dimensions the parts may be indented or rabbeted to receive a coating of metal which as shown in Figs. 2 and 3 will not extend beyond the outer limits of the uncoated parts.

In Fig. 3 I have shown a rectangular brush having parallel side faces and parallel front and back faces and made entirely of transversely laminated material metal sprayed at one end by a coating 16. The laminations are of progressively varying resistivity, varying from minimum resistivity of lamination 17l to maximum resistivity of lamination 17t, but unlike the conventional laminated brush where the laminations extend each across the width of the brush, the laminations 17 shown in Fig. 3 each extend across the narrower thickness of the brush and progressively vary in resistivity across the greater dimension (or width) of the brush.

Unlike the brush of Figs. 1 and 2, the brush of Fig. 3 is perfectly square so that it may be placed in a standard brush holder which however is slightly skewed to mount the brush as shown in Fig. 4 on a commutator 18 having a normal direction of rotation as indicated by arrow 19 with the brush skewed to form an angle of about 6 degrees (although any angle of, for example, from 3 to 15 degrees would be permissible) with the parallel sides of the commutator segments or, in other words so that brush leading and trailing faces form a small angle with a plane parallel to the axis of rotation of the commutator. As will be observed in Fig. 4, the commutator brush is so skewed at this angle that the highest resistivity segment 17t terminates at the corner of the brush which is trailing with respect to the rest of the brush and the lowest resistivity segment 17l terminates at a corner of the brush which is leading with respect to the rest of the brush.

Referring now to Fig. 5, a curve 21 represents the radio noise characteristic of a brush 21a which is, as shown, similar to the brush of Fig. 1. Curve 22 is a radio noise characteristic curve for a solid brush such as that shown at 22a and having a trailing edge tapered and otherwise of the same shape and dimensions as that of the overall assembly of brush 21a. The characteristics 21 and 22 are deduced from test values of millivolts derived from a radio noise or peak reading voltmeter connected across plus and minus brushes of a conventional commutating-field-equipped dynamoelectric machine and plotted against minus amperes and plus amperes representing, respectively, additional armature current subtracted from or added to a fixed value of current in the commutating field. The straight portions at the bottom of curves 21 and 22 represent the so-called "black band" of commutation at which there is no objectionable brush sparking either visible or, as is usually the case with radio wave propagating interference, invisible. It is apparent from a comparison of characteristic 21 with characteristic 22 that the brush of the invention provides a black band of from 2 to 3 times the width of that of a conventional solid brush, even though the brush (at least in the form shown in Fig. 1 and in Fig. 5 at 21a) retains practically all of the current carrying characteristics of the solid brush.

A brush constructed in accordance with the invention produces outstandingly good commutation ability since the novel arrangement at the trailing edge produces an efficient quencher of invisible sparks. Those skilled in the art will recognize the fact that the term "invisible" is used because the elimination of visible sparking is generally taken care of in a satisfactory manner by the use of commutating interpoles and other conventional arrangements although the problem of invisible radio wave propagating sparking has not heretofore been adequately solved to the disadvantage of ships, planes and other vehicles especially during wartime when radio silence is often desirable.

I do not intend to limit my invention to a case where only the main brush has laminations arranged transverse to the commutator segments, as obviously the invention includes an arrangement where graduated transversely arranged resistance material is incorporated in a brush separate from the main brush. While I have illustrated and described particular embodiments of my invention, it will be understood that numerous variations and modifications may be made without departing from the true spirit and scope of the invention, and I intend in the appended claims to cover all such variations and modifications as fall within the true spirit and scope of the invention.

What I claim as new and desire to secure by Letters Patent of the United States is:

1. A brush for a dynamoelectric machine comprising a solid rectangular body portion of low resistance carbonaceous material and a wedge shaped assembly of laminations of carbonaceous material each abutting on one side face of said rectangular body portion and progressively ranging in length and in unit resistivity from a short lamination of low resistance material at the V of said wedge to a long lamination of high resistance material at the base of said wedge.

2. A brush for a dynamoelectric machine commutator comprising a rectangular block portion of carbonaceous material fused at one end thereof to each of an assembly of carbonaceous material laminations of progressively varying resistivity with said assembly of laminations being machined off at an angle tapered with respect to said block portion so that the tapered face of said brush having determinate increments of progressively increasing resistivity considered in one direction may present substantially smaller increments of progressively increasing resistance considered in a transverse direction.

3. In a dynamoelectric machine having a commutator normally adapted to rotate in a single direction, a block shaped brush having a bottom face adapted to contact said commutator, thickness defining side faces parallel to each other, width defining front and back faces parallel to each other, laminations each extending across the thickness of said brush, means for holding said bottom face on said commutator with said front face disposed at an angle of from three to fifteen degrees to a plane extending parallel to the axis of rotation of said commutator, said laminations being of progressively different specific resistivity varying across the width of said brush from maximum resistivity for the lamination terminating at the trailing corner of said brush with said normal direction of commutator rotation, whereby in a rectangular brush of determinate lamination thickness, substantially smaller increments of varying resistivity may be realized in a direction transverse to said axially extending commutator.

4. In a dynamoelectric machine having a commutator normally adapted to rotate in a single direction, a block shaped brush as in claim 3 further characterized by a sprayed metal bond at one end thereof.

RICHARD T. LUNDY.

REFERENCES CITED

The following references are of record in the file of this patent:

FOREIGN PATENTS

| Number | Country | Date |
|---|---|---|
| 3,071 | Great Britain | of 1896 |
| 26,445 | Great Britain | of 1904 |
| 3,352 | Great Britain | of 1909 |
| 352,587 | France | June 6, 1905 |
| 542,203 | France | May 13, 1922 |